Jan. 13, 1931.    H. F. FUERSTENAU    1,788,995
HAND PORTABLE GUTTER MANURE LOADER
Filed Oct. 7, 1929    4 Sheets-Sheet 1
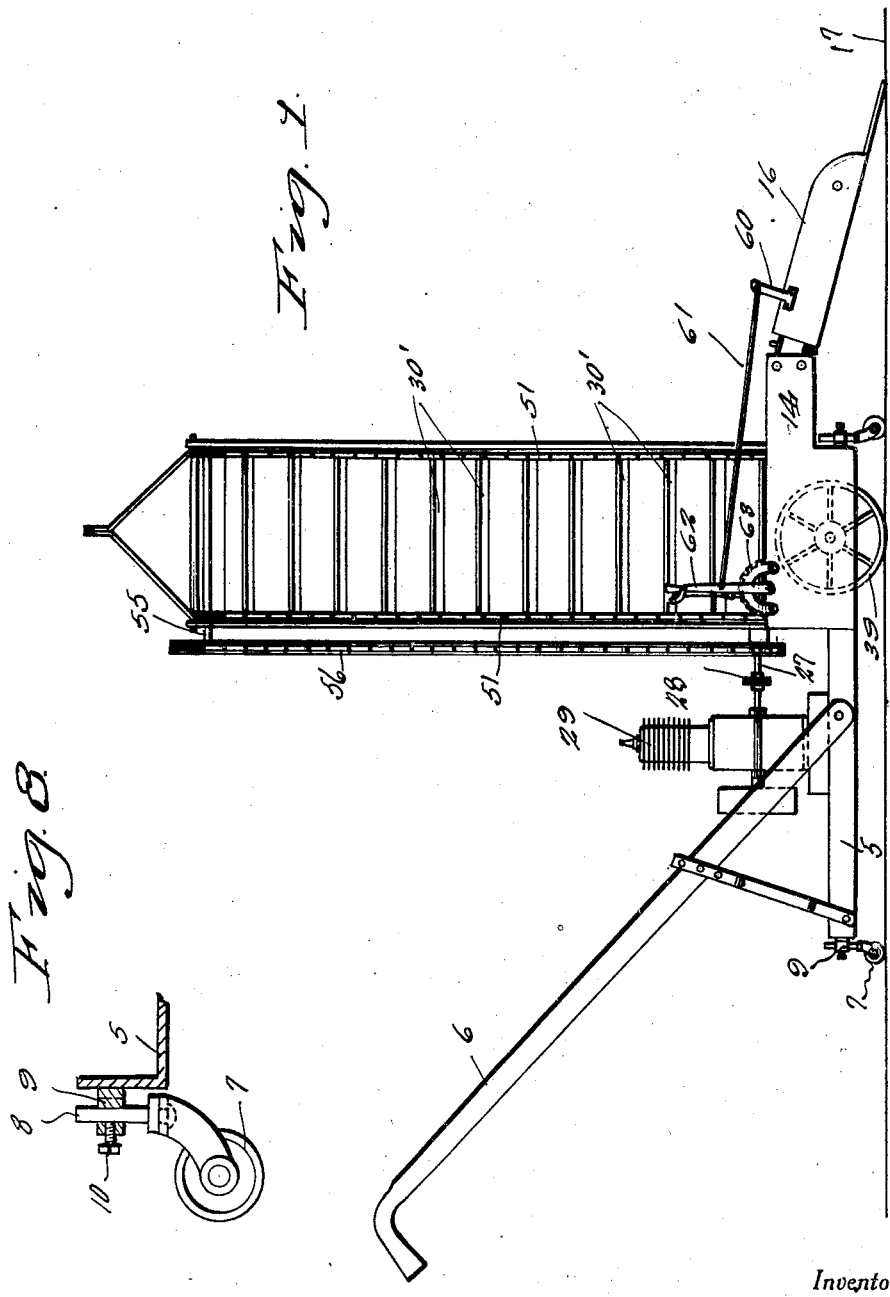
Inventor
Herbert F. Fuerstenau
By Clarence A. O'Brien
Attorney

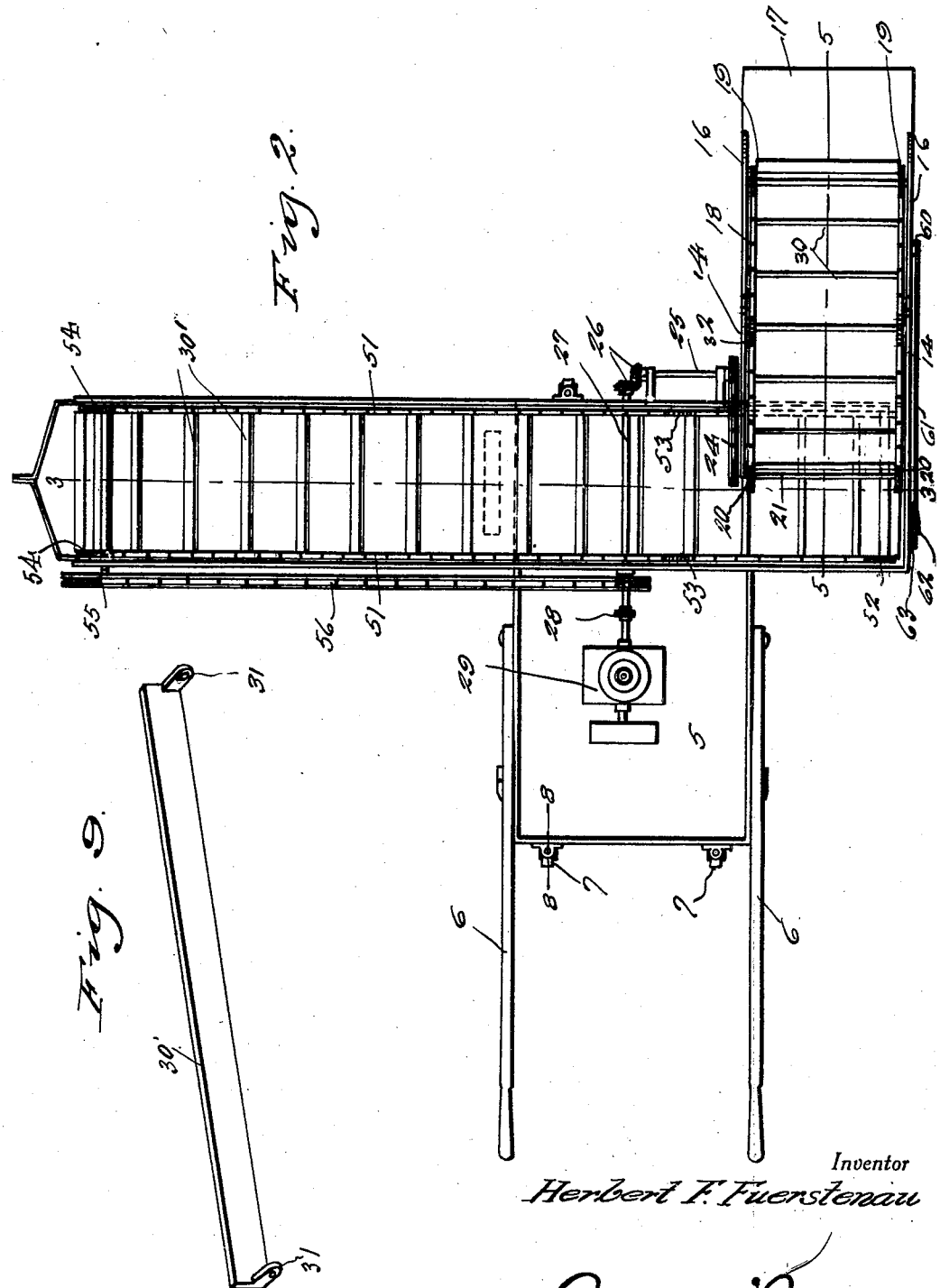

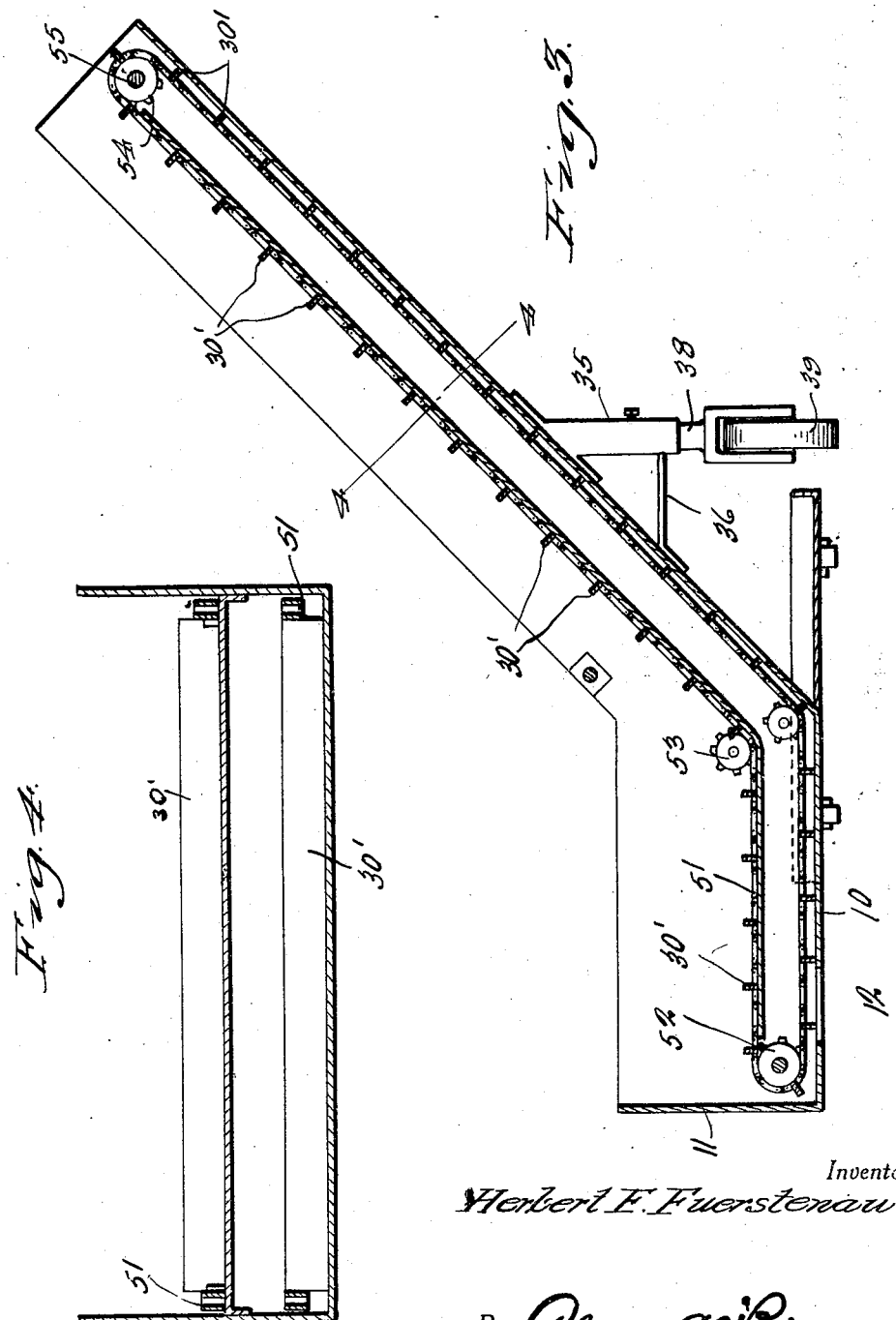

Jan. 13, 1931. H. F. FUERSTENAU 1,788,995
HAND PORTABLE GUTTER MANURE LOADER
Filed Oct. 7, 1929 4 Sheets-Sheet 4
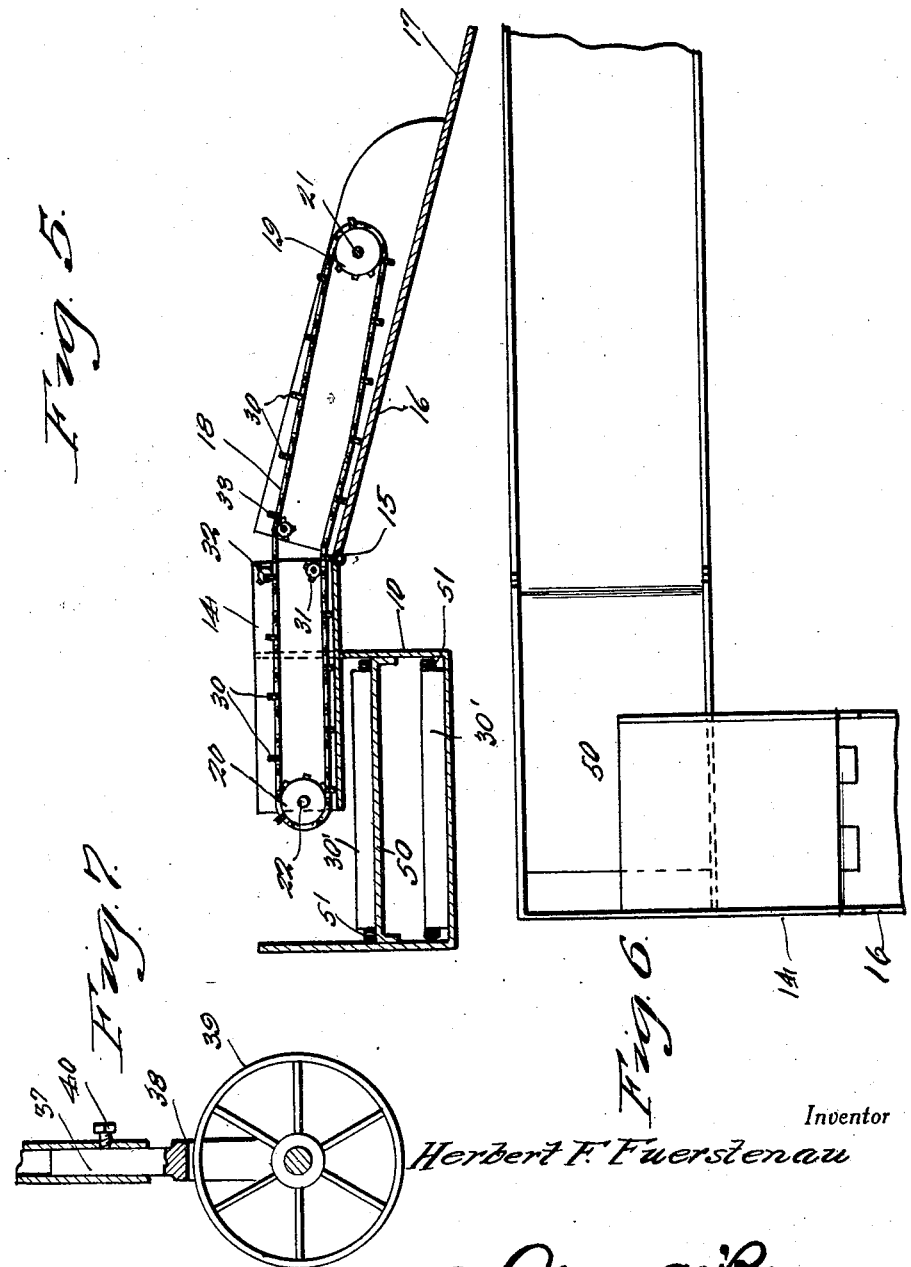
Inventor
Herbert F. Fuerstenau
By Clarence A. O'Brien
Attorney Patented Jan. 13, 1931

1,788,995

UNITED STATES PATENT OFFICE

HERBERT F. FUERSTENAU, OF HAZEL, SOUTH DAKOTA

HAND PORTABLE GUTTER MANURE LOADER

Application filed October 7, 1929. Serial No. 397,944.

The present invention relates to a machine designed for operation by hand which is portable and capable of picking up manure from a gutter and loading the same on trucks, manure spreaders or for any other similar purposes.

The object of the invention resides in the provision of a machine of this nature which is exceedingly simple in its construction, light, strong and durable, easy to manipulate, compact and convenient in its arrangement of parts, thoroughly efficient and reliable in use and operation, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of the machine embodying the features of my invention, Figure 2 is a top plan view thereof, Figure 3 is a transverse section taken substantially on the line 3—3 of Figure 2, Figure 4 is a detail section taken substantially on the line 4—4 of Figure 3, Figure 5 is a longitudinal section taken substantially on the line 5—5 of Figure 2, Figure 6 is a fragmentary top plan view of the trough, Figure 7 is an enlarged detail section through the mounting of the wheel, Figure 8 is an enlarged detail section showing one of the casters, taken substantially on the line 8—8 of Figure 2, and Figure 9 is a perspective view of one of the trough members for the endless conveyor.

Referring to the drawing in detail it will be seen that the numeral 5 denotes a tray with a pair of handle bars 6 secured to the sides thereof and inclining upwardly and rearwardly therefrom. A pair of casters 7 have shanks 8 secured in brackets 9 by set screws 10 on the rear wall of the tray 5 as is more clearly disclosed in Figure 8. An elevating trough 10 is formed integrally on the front end of the tray extending beyond one side thereof at one end and from an intermediate portion of the tray inclining upwardly to the other side thereof.

The lower end of this trough 10 is closed by an end wall 11 while the upper end thereof is open. The bottom of the horizontal portion of the trough 10 is provided with an opening 12. The front wall of the horizontal portion of the tray 10 has an opening in the upper portion thereof in which extends a fixed horizontal longitudinal trough section 14 of material collecting means to the front end of which is hingedly connected as at 15 a longitudinal trough section 16, the bottom of which is extended at its forward end to provide a scoop like portion or scraper 17 to scrape along the gutter and force the manure up into the section 16.

An endless conveyor construction or mechanism is associated with the trough sections 14 and 16 and comprises a pair of end chains 18 trained over sprockets 19 and 20 on shafts 21 and 22 respectively. The shaft 21 is journaled between the side walls of the trough section 16 while the shaft 22 is journaled between the inner or rear ends of the side walls of the trough sections 14 and is operatively connected by means of a chain and sprocket mechanism 24 with the shaft 25 which in turn is geared as at 26 with a longitudinal shaft 27 through the side walls of the trough 10 extending rearwardly and coupled as at 28 with the shaft of a suitable prime mover 29 which has an internal combustion engine or the like.

Cross plates 30 have ears 31 at the ends thereof engaged with the chains 18 so as to scrape along the bottoms of the sections 14 and 16. Idler sprockets 31 are provided in the lower portion of the forward end of the section 14 to engage the lower run of the chain while sprockets 32 are provided at the upper portion of the front end to engage over the upper runs of the chain and idler sprockets 33 are provided in the upper portion of the rear end of the section 16 to engage under the upper run of the chains 18 so as to hold these chains in a relatively taut position and yet allowing a limited swinging movement of the section 16 in relation to the section 14.

A tubular member 35 depends from the inclined portion of the trough 10 and is braced as at 36 and receives a shank 37 of a fork 38 in which is journaled a wheel 39. A set screw 40 holds the shank 37 at the desired adjustment.

Obviously by adjusting the shank 37 and fork 38 the machine may be raised or lowered with respect to the floor as may be necessary or desirable.

A platform 50 is mounted in the trough 10 above the bottom of the trough in parallelism therewith. An endless conveyor is disposed in the trough 10 and comprises a pair of endless chains 51 trained over sprockets 52 at the right hand of the trough 10, sprockets 53 in the intermediate portion of the trough 10 and sprockets 54 at the upper end of the trough 10.

The sprockets 54 are mounted on a shaft 55 which is operatively connected by a chain and sprocket mechanism 56 with the shaft 27.

A plurality of trough members 30' are disposed between the chains 51 similar in construction to cross members 30 and move along the bottom of the trough and the platform 50.

From the above detailed description it will be seen that a single person may move this machine along so that the scraper or scoop 17 slides along the gutter thereby forcing the manure up into the trough section 16 and the endless conveyor structure will move the manure back and drop the same on to the platform 50 and the endless conveyor in the tray 10 will move this manure up the inclined portion of the tray 10 to load it as may be desired.

It is thought that the construction, operation, utility and advantages of this invention will now be quite apparent to those skilled in this art without a more detailed description thereof.

It is preferable to provide an adjustment for the tray section 16 comprising an arm 60 fixed thereto and attached to a link 61 engaged with a lever 62 rockable on the section 14 and having suitable means 63 associated therewith so that the lever 62 may be held in different adjusted positions whereby the section 16 may be raised or lowered and held in desired adjusted position.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the combination and arrangement of parts may be resorted to without departing from the spirit or scope of the invention as hereinafter claimed or sacrificing any of its advantages.

Having thus described my invention, what I claim as new is:

1. A machine of the class described comprising a tray, casters for supporting the tray, handle bars attached to the sides of the tray inclining upwardly and rearwardly therefrom, an elevating trough across the tray and having one end inclined upwardly, an endless conveyor mechanism in the trough, a longitudinally extending trough section entering the lower end of the collecting trough, a longitudinal trough section hingedly connected with the forward end of the first mentioned longitudinal trough section for adjustment vertically thereof, an endless conveyor mounted in the hingedly connected trough sections, and means on the tray operatively connected with the endless conveyor mechanisms for operation thereof, said adjustably mounted trough section having a forward extension forming a scraper, means for adjusting the tray on the casters, a hollow shank depending from the inclined portion of the elevating trough, a shank adjustably mounted thereon, a fork on the lower end of the shank, and a wheel journaled in the fork, means for adjusting and holding in adjusted position the said adjustably mounted trough section.

2. A machine of the class described comprising a tray, casters for supporting the tray, handle bars attached to the sides of the tray inclining upwardly and rearwardly therefrom, an elevating trough across the tray and having one end inclined upwardly, an endless conveyor mechanism in the trough, a longitudinally extending material collecting trough composed of a relatively fixed inner section entering the lower end of the first mentioned trough and a relatively movable outer section hingedly connected with the forward end of the relatively fixed inner section, an endless conveyor mounted in the said sections, and means on the tray operatively connected with the endless conveyor mechanism for operation thereof, said hingedly mounted trough section having a forward extension forming a scraper, means for adjusting the tray on the casters, a hollow shank depending from the inclined portion of the elevating trough, a shank adjustably mounted thereon, a fork on the lower end of the shank, and a wheel journaled in the fork, means for adjusting and holding in adjusted position the said hingedly mounted trough sections, the endless conveyor mechanism in the trough section comprising endless chains with cross members adapted to scrape along the bottom of the trough sections.

3. A machine of the class described comprising a tray, casters for supporting the tray, handle bars attached to the sides of the tray inclining upwardly and rearwardly therefrom, a trough across the tray and having one end inclined upwardly, an endless conveyor mechanism in the trough, a longitudinally extending trough section entering the lower end of the first mentioned trough, a longitudinal trough section hingedly connected with the forward end of the first mentioned longitudinal trough section, an endless conveyor mounted in the trough sections, and means on the tray operatively connected with the endless conveyor mechanism for operation thereof, said hingedly mounted trough section having a forward extension forming a scraper, means for adjusting the tray on the casters, a hollow shank depending from the inclined portion of the trough across the tray, a shank adjustably mounted thereon, a fork on the lower end of the shank, and a wheel journaled in the fork, means for adjusting and holding in adjusted position the said hingedly mounted trough section, the endless conveyor mechanism in the trough section comprising endless chains with cross members adapted to scrape along the bottom of the trough sections, a platform extending in the transverse trough in spaced relation and in parallelism with the bottom thereof, said endless conveyor mechanism in said transverse trough comprising endless chains with cross members therebetween to scrape along the bottom of the transverse trough and along the platform therein.

In testimony whereof I affix my signature.

HERBERT F. FUERSTENAU.